Oct. 31, 1967
D. G. MAGILL, JR
3,350,484
METHOD AND APPARATUS FOR MAKING BATTERY SEPARATORS AND THE LIKE
Filed March 1, 1965
2 Sheets-Sheet 1
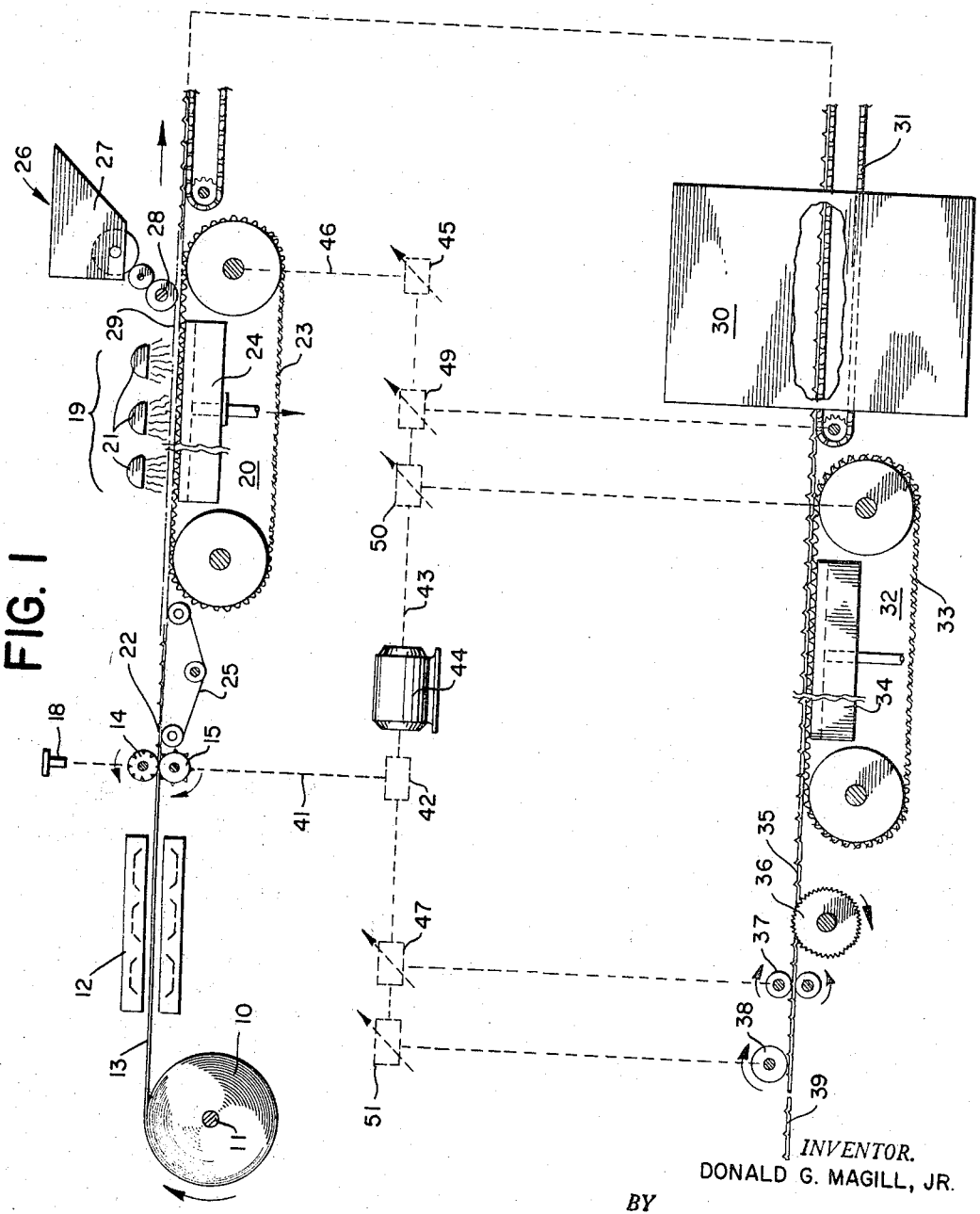
INVENTOR.
DONALD G. MAGILL, JR.
BY
*Mandeville & Schweitzer*
ATTORNEYS Oct. 31, 1967     D. G. MAGILL, JR     3,350,484
METHOD AND APPARATUS FOR MAKING BATTERY
SEPARATORS AND THE LIKE
Filed March 1, 1965     2 Sheets-Sheet 2

INVENTOR.
DONALD G. MAGILL, JR.
BY
*Mandeville & Schweitzer*
ATTORNEYS

United States Patent Office 3,350,484
Patented Oct. 31, 1967

3,350,484
METHOD AND APPARATUS FOR MAKING BATTERY SEPARATORS AND THE LIKE
Donald G. Magill, Jr., Milford, N.J., assignor to Riegel Paper Corporation, New York, N.Y., a corporation of Delaware
Filed Mar. 1, 1965, Ser. No. 436,257
12 Claims. (Cl. 264—90)

ABSTRACT OF THE DISCLOSURE

A method and apparatus for continuously manufacturing corrugated products such as battery separators in which a curable paper web is provided with ribs or corrugations at predetermined first intervals, and thereafter the web is controllably manipulated before it is completely cured to change the height and the spacing of the ribs.

---

The present invention is directed to the manufacture of battery separators and the like, and is directed more particularly to a novel and improved method and apparatus for manufacturing battery separators and the like on a more expeditious, high production basis than has been practicable heretofore, with greater controls being afforded over the end product.

In the manufacture of automobile lead-acid storage batteries, for example, it is conventional to utilize separator elements between the positive and negative lead plates of the battery. The separators must, of course, keep the plates spaced apart, under the relatively severe conditions imposed during normal use, and at the same time must have substantial and uniform porosity to accommodate the proper flow of electrolyte solution. One of the more popular forms of battery separators has been comprised of a paper web material of predetermined characteristics which is impregnated with a thermosetting resin, formed to provide predetermined ribs or corrugations, and cured to provide the necessary strength and rigidity for the intended service.

Battery separators of the type described above have in the past been manufactured primarily according to two processes. In the first process, the individual separators are formed with ribs and cured more or less on a stepwise or batch basis, which imposes undesirable limitations on production speed. In another conventional process, a continuous web of the uncured paper is formed with transverse ribs by means of a large, heated forming roll, and the ribbed web is retained in the roll sufficiently long to bring about at least partial curing of the resin and setting of the ribs. This last-described arrangement, while having some advantages over the batch process as regards production speeds, requires large and expensive equipment, and a particular set of corrugating rolls, representing a large and expensive part of the equipment, and is limited to the production of separators with a narrow range of rib heights. Moreover, production speeds are a function of the diameter of the corrugating roll on which the web is cured, and practical economic and engineering considerations are such that maximum speeds are relatively limited and inflexible.

In accordance with the present invention, a novel and significantly improved procedure is provided for continuously manufacturing battery separators or the like, in which a web of the paper starting material is continuously provided with ribs or corrugations while maintained in a "cold" condition, and in which the ribbed web is cured after removal from the corrugating or ribbing rolls.

As a particularly advantageous feature of the invention, arrangements are provided for controllably manipulating the uncured web after the ribbing step has been completed, whereby both the height of the ribs and the spacing thereof may be controllably varied. With this arrangement, a substantial variety of battery separators, tailored to suit the different requirements of individual battery manufacturers and of different battery structures, may be produced with a single set of corrugating rolls. Moreover, where the particular requirements to be met exceed the limits of variability of a given set of corrugating rolls, the procedure and apparatus of the invention are such as to accommodate easy and inexpensive interchangeability of sets of corrugating rolls. In this respect, since the ribbing or corrugating operation is carried out on a cold basis, the corrugating rolls may be small, easily handled, and quickly removable from the apparatus.

According to one significant aspect of the invention, a supply of battery separator web material is corrugated in a "cold" condition and then transferred directly onto a vacuum conveyor, which grips the web material over a substantial portion of its surface, represented by the web sections connecting adjacent ribs. The vacuum conveyor holds the form of the cold corrugated web material while it is exposed to sufficient heat to at least partially cure and set the ribbed material. Otherwise, the cold-ribbed web material would tend to lose its rib configuration when exposed to curing temperatures.

In conjunction with the foregoing, it is a feature of the invention to provide means, advantageously separate from the vacuum conveyor, although possibly incorporated in the conveyor itself, for controllably lengthening the ribbed web after the corrugating operation, whereby to controllably reduce the height of the ribs and increase the spacing thereof, in order to achieve a product of predetermined specifications. In this connection, it will be readily apparent that a given set of corrugating rolls has an inherent rib spacing, although, as contemplated by the present invention, arrangements may be provided for varying the height of the rib. In accordance with the invention, however, rib spacing may be controllably varied within the limits of a given set of corrugating rolls to suit individual requirements by initially forming the battery separators to have a minimum spacing and a greater than desired rib height and thereafter lengthening the web material prior to curing, simultaneously to reduce the rib height and increase the rib spacing to desired specifications.

The various improvements of the present invention provide for continuous mass production of battery separators and the like with equipment which is of a simplified, relatively low-cost nature, and at the same time provide for significantly greater flexibility with respect to the specifications of the product. For example, since curing of the ribbed web is effected after corrugation, easy variability of production speed is possible and a high maximum speed may be realized in a practical installation. In addition, by carrying out the forming of ribs in the absence of heat and postponing curing until the web is out of the corrugating rolls, glazing of the rib areas, with consequent loss of porosity, is avoided.

For a better understanding of the above and other advantageous features of the invention, reference should be made to the following detail description and to the accompanying drawing, in which:

FIG. 1 is a simplified, schematic representation of a production line for continuously manufacturing battery separators according to the principles of the invention;

Figure 4:
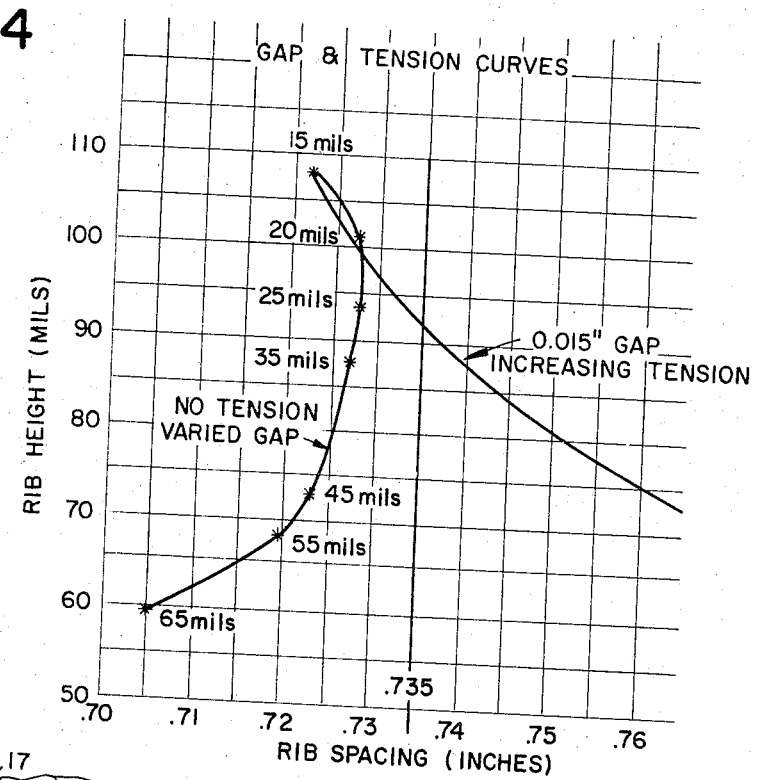
FIG. 4 is a simplified, graphic representation which is explanatory of certain techniques utilized in accordance with the invention in varying the rib specifications of the battery separators.

Referring now to the drawing, and initially to FIG. 1 thereof, the reference numeral 10 designates a supply roll of battery separator web material, which is supported on a constant tension unwind stand 11. The composition of the paper 10 is conventional and does not, of itself, constitute a feature of this invention. Typically, the web material constitutes about 50% fiber of which about half is cotton linters and about half is unbleached softwood kraft. The remaining 50 percent consists of about 42% thermosetting phenolic resin, about 8% volatile matter, and wetting agents commonly used in battery separator paper formulations.

Adjacent the unwind stand there is provided a preheating section 12, advantageously comprising radiant heaters arranged in opposed pairs on oposite sides of the web and adjustable toward and away from each other to control heating effectiveness. The physical arrangement of the preheating section is such that, as the unwinding web 13 passes therethrough, it is heated to a temperature of approximately 300° F. The principal objective of the preheating step is to soften the web material and make it pliable so that it will accept subsequent corrugation. In addition, the preheating step may be carried on such as to advance the conversion of the thermosetting phenolic resin as far as practicable without, however, actually completely curing any part of the resin.

Figure 2:
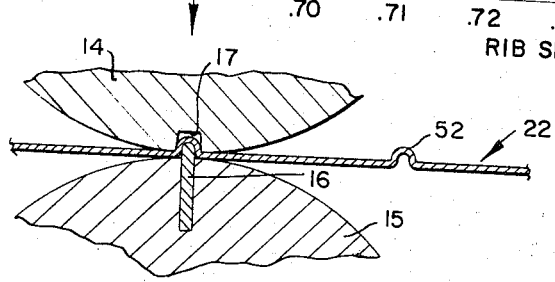
FIG. 2 is an enlarged, fragmentary, cross-sectional view, illustrating features of the corrugating or ribbing rolls used in the apparatus of FIG. 1.

After emerging from the preheating section 12, the uncured flat web 13 is directed through a pair of corrugating rolls 14, 15, which form predetermined ribs in the web material, extending transversely from one side to the other. In a typical production apparatus, the corrugating rolls 14, 15, which may be water cooled, may be about 4 inches in diameter and they may be provided with sufficient pairs of ribs and grooves to provide for a rib spacing on the rollers of about .70 inch. Most advantageously, the bottom roll 15 is provided with metal ribbing elements or blades 16 (see FIG. 2), and the upper roll 14 is provided with grooves 17 of suitable contours and dimensions to receive the blades 16 along with the web material. For a typical production arrangement, the ribbing blades 16 may project radially about .115 inch from the roll surface, and the grooves 17 in the upper roll may have a depth of about .110 inch. In accordance with one aspect of the invention, one of the corrugating rolls, and most advantageously the upper roll 14, as adjustable toward and away from the other roll 15, by suitable means such as a hand wheel 18, so that the extent of projection of the ribbing blades 16 in the groove 17 can be controllably varied.

On the exit side of the corrugating rolls 14, 15 is a partial curing chamber generally designated by the numeral 19, which includes a conveyor 20 for suppirting and carrying the ribbed web and a plurality of gas fired radiant heaters 21 disposed above the web. The operation of the curing chamber 19 is such that, as the ribbed web 22 is conveyed therethrough, the rib formations therein are substantially set, and the curing of the thermosetting resin is advanced, although not completed.

In accordance with one of the significant aspects of the invention, the conveyor 20 comprises a wire screen 23 which, in its upper horizontal reach, is directed over a vacuum box 24. Advantageously, the vacuum box is arranged to draw a vacuum of about ½ inch of water over its entire surface, which typically might be about 18 feet in length and approximately the full width of the web material. Thus, the uncured, ribbed web material advancing into the curing chamber 19 from the corrugating rolls 14, 15 is engaged over its bottom surface by the vacuum screen conveyor, such that the ribbed web material is held firmly in place on the screen as it advances through the curing chamber. It will be observed, in this respect, that the orientation of the corrugated rolls is such as to project the ribs upward, enabling the vacuum screen conveyor to act against a flat bottom surface of the web material.

During its travel through the curing chamber, the web material is exposed to the radiant heaters 21, which advance the thermosetting resin to a partially cured state, fixing the rib structure sufficiently to withstand further handling on the production line, although not necessarily sufficiently for end use purposes. Normally, if the ribbed but uncured web material were to be exposed to the heat of the curing chamber after leaving the corrugated rolls, the sheet would tend to flatten out and lose at least a significant part of its rib formation. This is avoided in accordance with the present invention by vacuum holding of the flat sections of the web material while it is conveyed during this partial curing stage.

Since the metal screen 23 utilized in the conveyor 20 requires a relatively large radius of curvature (typically at least 12 inches), it may be advantageous to provide transfer belts 25 or the like between the corrugated rollers and the conveyor screen to carry the uncured ribbed web free of the tension of its own weight substantially onto the conveyor screen.

Adjacent the exit side of the partial curing chamber 19 is a rib coating station 26, which includes a reservoir 27 for holding a supply of thermosetting resin and an applicator roller 28, the surface of which is aligned approximately with the top of the ribs of the partially cured web 29 emerging from the chamber 19. The coater 26 applies additional thermosetting phenolin resin or any other suitable material to the upper surface areas of the ribs, so that these areas are given extra reinforcement against mechanical and chemical actions to which they are subjected in use.

In the process of the invention, advantages are realized in the rib coating stage, by reason of the cold corrugation procedure used in the formation of ribs. Thus, because the cold-formed ribs retain significantly greater porosity than ribs formed under heat, there is a greater acceptance of the coating resins. This affords valuable extra protection to the separators in use.

Adjacent to the exit side of the partial curing chamber 19 and following the rib coater 26, there is provided a final curing chamber 30. Advantageously, the final curing chamber 30 is in the form of a hot air oven, which may be maintained at a temperature on the order of 375° and which is of appropriate length in relation to the linear speed at which the process is carried out and to the specific characteristics of the paper and resin to effect complete curing of the resin impregnated web material, as well as the resin coated ribs thereof.

As illustrated in FIG. 1, the ribbed web material is conveyed through the curing chamber 30 by means of a chain conveyor 31 which supports the bottom surface of the web. In accordance with one of the specific aspects of the invention, the chain conveyor 31 is driven at a speed slightly in excess of the rate of travel of the web material, so that there is a slight relative movement between the chain and the web material during curing. This advantageous arrangement not only enhances uniformity of the curing, but also prevents the chain from marking or otherwise altering the web surface, which otherwise might occur if the chain and web traveled in precise synchronism during the curing operation.

At the exit side of the curing chamber 30 there is provided a second vacuum conveyor 32 which includes a conveyor screen 33 and suction table 34. The second vacuum conveyor not only affords further control over the travel of the ribbed web but it promotes rapid cooling of the web material from its curing temperature by reason of the drawing of air through the porous web and into the suction chamber 34, which may be maintained under a vacuum on the order of ½ inch of water.

The cured, ribbed web material 35 leaving the second vacuum conveyor is carried through a plurality of saws 36, advantageously mounted below the web for rotation against the direction of travel of the web, by means of a pair of pull rollers 37. The pull rollers advantageously are of resilient material and are arranged to exert a sufficient grip on the web material to place it under tension back to the first vacuum conveyor 20. In this respect, the pull rollers 37 may exert adequate gripping pressure upon the ribbed web material, because by this time the web material has been fully cured and its rib structure rendered permanent.

Figure 3:
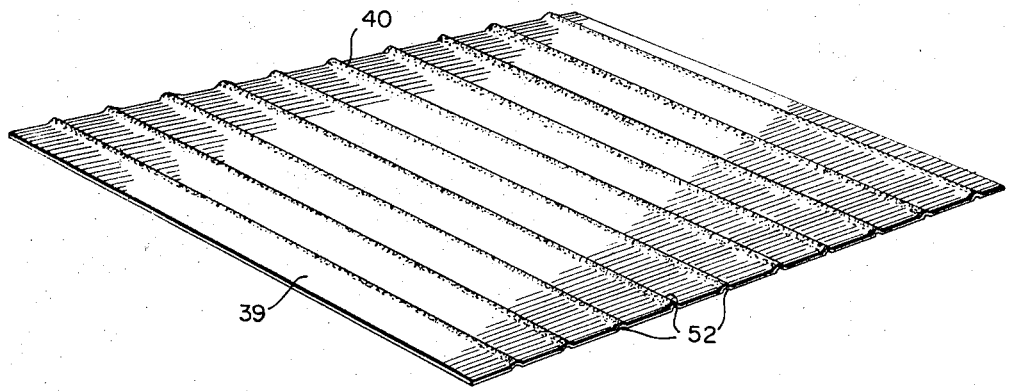
FIG. 3 is a perspective view of an individual battery separator produced in accordance with the invention.

The spacing of the saws 36 is such as to divide the advancing web into strips of predetermined width suitable for individual separators. Thereafter, after the slit web has passed through the pull rollers 37, the individual web strips pass under a cutter 38, which divides the strips into individual separator sections 39 of proper length, suitable for ultimate use. FIG. 3 is a perspective representation of an individual battery separator 39 produced in accordance with the invention, with the reinforcing coating of the individual ribs 52 being indicated by the reference numeral 40.

One of the process controls provided in the system of the present invention resides in proper speed control of the various elements relative to each other. Reference process speed may be established at the corrugating rolls 14, 15 suitably driven from a take-off shaft 41 and take-off box 42. The take-off box 42 is operated by a main power shaft 43 driven by a motor 44. Typically, the motor 44 may be of a variable speed type, or else variable speed control means may be provided between the output of the motor 44 and the main drive shaft 43. The corrugating rolls may be driven directly at shaft speed, and the transfer tapes 25 advantageously are driven at an identical surface speed to assure tension-free transfer of the pliable ribbed material 22 from the corrugating rolls to the first vacuum conveyor 20.

At least one of the elements subsequent to the corrugating rolls, which is able to exert a tractive influence on the ribbed web material, and most advantageously the first vacuum conveyor 20 and/or the pair of pull rollers 37 located near the exit end of the line, is arranged to be driven at a speed controllably above the speed of the corrugating rolls. Thus, in the process and apparatus illustrated in FIG. 1, the vacuum conveyor 20 is driven through an adjustable take-off box 45 and take-off shaft 46, and the pull rollers 37 are driven from an adjustable take-off box 47 and take-off shaft 48. While the invention does contemplate that the pull rollers 37 and/or vacuum conveyor 20 may in some instances be operated at the same speed as the corrugating rolls, it is intended that, in most instances, they will be operated at a controllably higher speed, so as to exert a slight tension on the web material, at least on the first vacuum conveyor 20. The arrangement is such that the ribbed material, while it is still in its soft and pliable state, may be controllably elongated on the first vacuum conveyor 20 to reduce rib height and increase rib spacing to predetermined specifications.

The chain conveyor 31, second vacuum conveyor 32 and cutter 38 all are advantageously driven from individual variable take-off boxes 49–51. The box 49 is set to drive the conveyor chain slightly faster than the travel of the web material, not particularly for the purpose of exerting tractive force on the web but primarily to maintain a slight relative motion between the chain and the web during the curing operation. The second vacuum conveyor 32 advantageously is run in relative synchronism with the pull rollers 37, and the vacuum conveyor may influence the operation of the pull rollers to some degree. However, the second vacuum conveyor 32 is not relied upon to exert significant tractive effort, inasmuch as it is preferred to maintain the vacuum level on the conveyors at a relatively low level to minimize wear on the conveyor screens, which may be formed of a material such as stainless steel. Likewise, where adequate traction is available at the pull rollers 37, the first vacuum conveyor 20 need not be relied upon for tractive effort to minimize wear.

In the illustrated arrangement, the final cutter 38 is controlled by the variable take-off box 51 to provide control over the length of the cut-off sections.

Although such factors as basic process speed and unwind tension may have an effect on the process, it is significantly preferred to render these and other isolatable variables relatively constant and to control the process substantially by varying the height of the ribs or corrugations 52 and by the relative speeds of the corrugating rolls and the pull-out rollers 37. The general effect of this control may be visualized by reference to the graph of FIG. 4, in which rib height is plotted against rib spacing under limit conditions of no pull-out tension on the web with various adjustments of the corrugating rolls, as the lefthand curve of the graph, and increasing pull-out tensions with a minimum corrugating roll gap setting, as the righthand curve of the graph. The data represented by the graph was obtained using a conventional 27 mil separator web material in conjunction with corrugating rolls having blades 16 provided with a 115 mil projection and grooves 17 having a depth of 110 mils. Samples were run without any tension in the web material, but with adjustment of the corrugating rolls to vary the gap between the tip of the blade and the bottom of the groove from a maximum of 65 mils to a minimum of 15 mils. This resulted in increasing rib heights, from a minimum of 60 mils to a maximum of about 108 mils. Rib spacing varied from about 0.705 to about 0.728 inch. Thereafter, while holding the gap at 15 mils, increasing tension was applied to the web, which enabled the rib height to be drawn down from about 108 mils to about 71 mils, while increasing rib spacing from about 0.72 to about 0.76 inch.

As will be readily understood, the process can be easily varied and controlled while operating within the area encompassed below the variable gap and variable tension curves as illustrated in FIG. 4. For a given set of circumstances, including paper specifications, corrugating roll configuration, speeds, temperatures, etc., a curve of the type shown in FIG. 4 may be readily established, to afford precise variability and control of the process.

The process of the invention is significantly advantageous over processes heretofore known for the mass production manufacture of battery separators. In particular, the process of the invention enables battery separators to be produced on a continuous basis using simplified corrugating rolls for imparting transverse ribs and providing for the curing of the ribs to be performed subsequent to the corrugating stage but in such manner that the corrugated configuration of the web material is maintained until the web material is fixed. One significant advantage of this arrangement is that, since the web material is cured subsequent to the corrugating stage, the corrugating rolls may be very small and inexpensive, and capable of easy and rapid interchange for extending the range of process variables. However, it is a further and significant advantage of the process and apparatus that substantial process variability is provided, with respect to height and spacing of separator ribs, with a given set of corrugating rolls, such that a single line, operating with a single set of rolls, is able to accommodate most of the variables encountered in day-to-day production for various manufacturers demanding separators of different physical specifications.

A basic aspect of the invention resides in the combined effect of providing for a controlled gap adjustment in the corrugating rolls in conjunction with controllable elongation of the corrugated web while the web material remains in a pliable condition. Thus, although the spacing of corrugating elements cannot be changed in a given set of corrugating rolls, it is possible to increase controllably the rib spacing in the completed separators by initially forming the ribs higher than specification and then controllably elongating the web to reduce the rib height and increase the rib spacing to the specified dimension.

The controllable variability afforded by the process and apparatus of the present invention are significantly advantageous for continuing production runs, even where substantial changes in rib height and rib spacing are not required, inasmuch as the arrangement of the invention afford precision control over the process so that accommodation may be made for day-to-day variations in materials and conditions.

Apart from the control of the process afforded by adjustable variability in the corrugating rolls and in the pullout system, a significantly advantageous feature of the invention resides in the use of a vacuum conveyor immediately subsequent to the corrugating rolls, arranged to grip the flat side of the corrugated web material while it is still in a pliable condition and retain its rib formation (unless controllably changed in the manner above described) while the ribs are subjected to sufficient heat partially to cure the impregnated resin and set the ribs sufficiently for further process handling.

Among the important practical advantages of the new process is the realization of high and easily variable processing speeds. Thus, where rib formation and curing are carried out on a hot corrugating roll, production speed variability becomes, at least partly, a function of roll diameter, machine geometry, etc., which imposes severe practical limitations on production equipment. According to the present system, however, production speed is independent of corrugating roll size and machine geometry and is more a function of conditions in the curing chamber and other heating chambers, which are more readily controllable and less subject to practical limitations as to maximum capacity.

Cold corrugated battery separators made in accordance with the invention have the significant advantage of being more uniformly porous throughout and particularly in the rib area. Because the ribs are formed without heat and cured without pressure, there is no tendency for the rib areas to glaze over, as is experienced in conventional processes. The resulting improved porosity is a significant advantage, in that it improves the efficiency of the separators. At the same time, the separator ribs, because of their increased porosity, have a greater acceptance of rib coating resins than otherwise, so that the finished, coated and cured separators have increased mechanical and chemical protection.

It will be understood, of course, that the specific form of the invention herein illustrated and described is intended to be representative only, as certain variations may be made therein without departing from the clear teachings of the disclosure. Thus, the process and apparatus of the invention have indicated usefulness in the production of specialty corrugated products other than battery separators, where precision of control and uniformity of web characteristics are significant considerations. Corrugated filter materials, for example, may be produced with advantage according to the broader concepts of the invention. Accordingly, reference should be made to the following appended claims in determining the full scope of the invention.

I claim:
1. The method of making corrugated web material, which comprises
   (a) supplying an uncured web material including a curable hardening component,
   (b) imparting rib corrugations to said web at spaced intervals,
   (c) conveying the corrugated web through a heating zone, thereby effecting at least partial curing of the curable hardening component,
   (d) releasably holding the corrugated web during partial curing by vacuum means applied to the flat surface of the web opposite the raised ribs.
2. The method of claim 1, further characterized by
   (a) said web being elongated to increase the intervals between the ribs and reduce the height of the ribs while said web is releasably held; and
   (b) said web thereafter being permanently set in its elongated condition.
3. The method of claim 1, further characterized by
   (a) said web material comprising a fibrous battery separator web;
   (b) said hardening component comprising a thermoset acid resistant setting;
   (c) said web being cut into individual battery separator sections after being permanently set.
4. The method of claim 1, in which
   (a) said web is releasably held against a porous conveyor surface while said web is being partially cured to semi-permanently set said ribs;
   (b) said web is thereafter and in following sequence fully cured while being conveyed through a curing chamber.
5. The method of making ribbed web material, which comprises
   (a) supplying a deformable web material,
   (b) imparting rib corrugations to said web at spaced intervals,
   (c) said imparted ribs exceeding a predetermined rib height and being separated less than a predetermined rib spacing,
   (d) controllably elongating the corrugated web to achieve said predetermined rib height and rib spacing,
   (e) said elongation being accompanied by longitudinal tension forces applied to the corrugated web,
   (f) curing the elongated web to six said ribs.
6. The method of making ribbed web material, which comprises
   (a) supplying an uncured deformable web material including a curable hardening component,
   (b) imparting rib corrugations to said web at spaced intervals,
   (c) said imparted ribs exceeding a predetermined rib height and being separated less than a predetermined rib spacing,
   (d) at least partially curing said curable hardening component by exposure to radiant heat,
   (e) releasably holding the corrugated web during partial curing by vacuum means applied to the flat surface of the web opposite the raised ribs,
   (f) controllably elongating the corrugated web to achieve said predetermined rib height and rib spacing,
   (g) said elongation being accomplished by longitudinal tension forces applied to the corrugated web,
   (h) curing the elongated web to finally fix said ribs.
7. The method of making a battery separator or the like, which comprises
   (a) supplying a continuous uncured web of fibrous paperlike material including an uncured thermosetting resin;
   (b) at spaced intervals deforming the web in one direction to form spaced transverse ribs;
   (c) after formation of the ribs, engaging and releasably holding the flat web sections on the surface thereof opposite the ribs by air pressure against a partially evacuated space;
   (d) said web being conveyed past said partially evacuated space and being held by said air pressure against a moving, porous conveying surface positioned between the web and the partially evacuated space;
   (e) while releasably holding the ribbed web, exposing at least the ribs to sufficient heat to at least partially cure and semi-permanently set the ribs;
   (f) thereafter permanently setting the ribbed web while conveying said web through a curing chamber to fully cure the same.
8. Apparatus for making battery separators or the like, comprising

(a) means for supplying uncured battery separator web material,
(b) a pair of corrugating rolls arranged to act on opposite sides of the web and form spaced ribs interconnected by flat web sections,
(c) a vacuum conveyor positioned to receive and releasably hold the flat web sections of the ribbed web,
(d) means for heating the web while it is conveyed by said vacuum conveyor, and
(e) means adapted to engage the web on the exit side of the corrugating rolls for elongating the ribbed web to increase the distance between ribs and reduce the height thereof.

9. Apparatus according to claim 8, further characterized by
(a) said means for elongating including means for engaging the web on the exit side of the vacuum conveyor, whereby the web is elongated while held and carried by the conveyor.

10. Apparatus according to claim 8, further characterized by
(a) said means for elongating being controllably variable, and further including
(b) means for adjustably positioning the corrugating rolls whereby to vary the initial rib height.

11. Apparatus for making battery separators or the like, comprising
(a) means for supplying uncured battery separator web material,
(b) a pair of corrugating rolls arranged to act on opposite sides of the web and form spaced ribs,
(c) a partial curing chamber positioned after the corrugating rolls, comprising vacuum means for releasably holding the flat web surfaces of the corrugated web material and heating means for at least partially curing the corrugated web while it is being releasably held,
(d) a high temperature curing oven located after the partial curing chamber,
(e) means for applying tension to the web, located after the partial curing chamber, whereby said ribs may be controllably reduced in height and further separated.

12. Apparatus according to claim 11 further characterized by
(a) said tension supplying means being controllably variable, and further including
(b) means for adjustably positioning the corrugating rolls whereby to vary the corrugation rib height.

References Cited

UNITED STATES PATENTS

| | | | |
|---|---|---|---|
| 2,577,205 | 12/1951 | Meyer et al. | |
| 2,662,106 | 12/1953 | Uhlig et al. | 136—148 X |
| 2,687,445 | 8/1954 | Merrill | 136—148 X |
| 3,000,439 | 9/1961 | Moore | 162—362 X |
| 3,057,771 | 10/1962 | Schenck | 136—148 X |

WINSTON A. DOUGLAS, *Primary Examiner.*
D. L. WALTON, *Assistant Examiner.*